(12) United States Patent
Braedt et al.

(10) Patent No.: US 9,316,302 B2
(45) Date of Patent: Apr. 19, 2016

(54) JOCKEY WHEEL FOR A REAR DERAILLEUR IN A BICYCLE GEAR SYSTEM AND REAR DERAILLEUR WITH SUCH A JOCKEY WHEEL

(71) Applicant: SRAM Deutschland GmbH, Schweinfurt (DE)

(72) Inventors: Henrik Braedt, Hambach (DE); Robert Boehm, Mainberg (DE); Thorsten Hamisch, Würzburg (DE)

(73) Assignee: SRAM Deutschland GmbH, Schweinfurt (DE)

( * ) Notice: Subject to any disclaimer, the term of this patent is extended or adjusted under 35 U.S.C. 154(b) by 268 days.

(21) Appl. No.: 13/937,987

(22) Filed: Jul. 9, 2013

(65) Prior Publication Data

US 2014/0162821 A1 Jun. 12, 2014

(30) Foreign Application Priority Data

Jul. 9, 2012 (DE) .......................... 10 2012 013 645

(51) Int. Cl.
| | |
|---|---|
| F16H 9/00 | (2006.01) |
| F16H 59/00 | (2006.01) |
| F16H 61/00 | (2006.01) |
| F16H 63/00 | (2006.01) |
| F16H 55/30 | (2006.01) |
| B62M 9/126 | (2010.01) |

(52) U.S. Cl.
CPC .............. *F16H 55/30* (2013.01); *B62M 9/126* (2013.01)

(58) Field of Classification Search
CPC .......... F16H 55/30; F16H 7/06; B62M 9/126; B62M 9/105; B62M 9/16

USPC ...................................................... 474/80, 82
See application file for complete search history.

(56) References Cited

U.S. PATENT DOCUMENTS

| | | | | | |
|---|---|---|---|---|---|
| 257,445 | A | * | 5/1882 | Lechner | 474/164 |
| 536,813 | A | * | 4/1895 | MacPhail | 474/152 |
| 586,991 | A | * | 7/1897 | Curley | 474/156 |
| 591,270 | A | * | 10/1897 | Gauthier | 474/156 |
| 1,482,896 | A | * | 2/1924 | Huntington et al. | 474/152 |
| 2,602,343 | A | * | 7/1952 | Barrett et al. | 474/156 |
| 3,969,947 | A | * | 7/1976 | Martin et al. | 474/156 |
| 3,990,136 | A | * | 11/1976 | Hishida | 29/893.37 |
| 4,144,773 | A | * | 3/1979 | Addicks | 474/161 |
| 4,174,642 | A | * | 11/1979 | Martin et al. | 474/156 |

(Continued)

FOREIGN PATENT DOCUMENTS

| | | |
|---|---|---|
| DE | 102011114699 | 4/2012 |
| DE | 202012100782 | 5/2012 |

*Primary Examiner* — Henry Liu
(74) *Attorney, Agent, or Firm* — Milan Milosevic; Lisa Serdynski

(57) ABSTRACT

The invention relates to a guide wheel for a rear derailleur in a bicycle gear system for guiding a chain, including an annular wheel body with a central opening for rotatable bearing about a rotational axis of the guide wheel. The guide wheel includes a plurality of radially projecting teeth that are arranged on an outer circumferential surface of the wheel body. A tooth gap is arranged between each adjacent pair of teeth, individual teeth in the area of a root circle of the gear teeth having a predetermined tooth width matched to the chain. For improving the guiding properties, it is provided that the guide wheel has on at least some of the tooth gaps in the area near a tooth gap base and/or on at least some of the teeth at least one guide segment with a greater width than the tooth width of at least one of the adjacent teeth.

31 Claims, 5 Drawing Sheets

(56) References Cited

U.S. PATENT DOCUMENTS

| | | | |
|---|---|---|---|
| 4,198,874 A * | 4/1980 | Nagano et al. | 474/82 |
| 4,226,131 A * | 10/1980 | Yamasaki | 474/82 |
| 4,240,303 A * | 12/1980 | Mosley | 474/144 |
| 4,261,214 A * | 4/1981 | Watanabe et al. | 474/156 |
| 4,433,963 A * | 2/1984 | Shimano | 474/80 |
| 4,573,949 A | 3/1986 | Nagano | |
| 4,580,327 A * | 4/1986 | Juy | 29/418 |
| 4,813,916 A * | 3/1989 | Valin | 474/152 |
| 5,350,339 A * | 9/1994 | Carmichael | 474/79 |
| 5,466,194 A * | 11/1995 | Steinberg et al. | 474/80 |
| 5,711,731 A * | 1/1998 | Fukuda | 474/79 |
| D406,084 S * | 2/1999 | Kojima | D12/124 |
| 7,244,203 B2 * | 7/2007 | Sze et al. | 474/82 |
| 7,318,784 B2 * | 1/2008 | Onogi et al. | 474/82 |
| 7,361,110 B2 * | 4/2008 | Oishi et al. | 474/82 |
| 7,686,721 B2 * | 3/2010 | Tabe et al. | 474/152 |
| 7,780,558 B2 * | 8/2010 | Kunisawa | 474/80 |
| 7,824,287 B2 * | 11/2010 | Nonoshita et al. | 474/161 |
| 2005/0192138 A1 * | 9/2005 | Sze et al. | 474/78 |
| 2006/0116227 A1 * | 6/2006 | Mercat et al. | 474/82 |
| 2006/0258498 A1 * | 11/2006 | Tabe et al. | 474/160 |
| 2007/0054768 A1 * | 3/2007 | Miyazawa | 474/152 |
| 2008/0194363 A1 * | 8/2008 | Kunisawa | 474/82 |

* cited by examiner

JOCKEY WHEEL FOR A REAR DERAILLEUR IN A BICYCLE GEAR SYSTEM AND REAR DERAILLEUR WITH SUCH A JOCKEY WHEEL

BACKGROUND OF THE INVENTION

In bicycle gear systems it has long been known and common to equip a rear derailleur with two jockey or guide wheels or chain guide rollers that are rotatably borne in a pre-tensioned chain guide arrangement. These guide wheels have a plurality of functions. They tension the return path of the chain and provide sufficient chain length corresponding to the selected gear ratio of the chain gear system. Moreover, in the chain guide arrangement it is the task of the guide wheels to reliably guide the chain, even when there is strong axial displacement or the chain is on an incline, as may often happen during gear changing.

A number of rear derailleur devices are known from the prior art. For instance, DE 296 23 610 U1 provides a rear derailleur for a derailleur gear system that has guide wheels of different sizes.

DE 1 262 141 illustrates a guide wheel with partly or completely beveled profile surfaces along the gear teeth. What this achieves during operation is that individual teeth in the gear teeth can engage more easily in the intermediate spaces in the chain.

U.S. Pat. No. 4,575,365 illustrates a derailleur with guide wheels that are embodied with greater material thickness in their bearing area in the clearly radial distance from the tooth gap base about the central opening for improving the bearing properties. This measure has no effect on guiding the chain because the thickening in the guide wheels in the radially inner area does not interact with the chain supported on the guide wheel. A similar solution is known from U.S. Pat. No. 5,711,731.

As is generally known, depending on the type of construction, conventional bicycle chains have alternating outer and inner chain links that connect successive chain rollers to one another. Corresponding alternating link spacing results from the alternating arrangement of outer and inner chain links, i.e. smaller link spacing is present between the inner links and relatively larger link spacing is present between the outer links. When the outer gear teeth are embodied with an essentially constant thickness for all of the teeth, as is the case with the solutions from the prior art described in the foregoing, all of the teeth must be matched to the smaller link spacing between the inner chain links so that the teeth between outer chain links engage with substantial lateral clearance. However, this is at the expense of the guiding properties of the gear teeth, because the chain is guided laterally (axially) only by every second set of links, specifically always by only the inner chain links and their smaller link spacing that is matched to the tooth width. This can lead to problems, especially when the chain is subjected to strong inclines in certain gearing positions or during gear changing. In certain riding situations this can result in strong vibrations that may lead to the chain slipping completely off of the guide wheel. In addition, other consequences of this problem may be gear changing problems, the chain jamming, noisiness, and increased wear. The limited guiding properties of conventional chain guide arrangements may lead to problems, especially in new derailleur gears that have a plurality of sprockets on the rear axis of the bicycle.

U.S. Pat. No. 4,174,642 describes a chain drive sprocket for agricultural machinery such as conveyor mechanisms, the outer teeth of which alternate in thickness. The teeth are provided with angled faces that function to center the chain on the sprocket.

An underlying object of the invention is to provide a guide wheel and a derailleur embodied therewith that has improved guiding properties.

BRIEF SUMMARY OF THE INVENTION

The invention relates to a guide wheel for a rear derailleur in a bicycle gear system for guiding a chain, including an annular wheel body with a central opening for rotatable bearing about a rotational axis of the guide wheel and including a plurality of radially projecting gear teeth that are arranged on an outer circumferential surface of the wheel body. A tooth gap is arranged between all circumferentially adjacent teeth and in the area of a root circle of the gear teeth each of the plurality of teeth having a predetermined tooth width matched to the chain.

This object is attained, in one embodiment, using a guide wheel of the aforesaid type in which it is provided that the guide wheel has on at least some of the tooth gaps in the area near a tooth gap base and/or on at least some of the teeth at least one guide segment with a greater width. The guide segment is configured for supporting chain links, especially the inner chain links, and has a width greater than the maximum tooth width of at least one of the adjacent teeth.

In contrast to the drive sprocket of U.S. Pat. No. 4,174,642, which was described in the foregoing, due to the inventive measure the guiding properties of each guide wheel are improved in that the chain is guided better in the area of the tooth gap base and/or also along the tooth. This is attained in that the guide segment radially supports at least one chain link of an inner link pair of the chain on the tooth gap base or along the force-transmitting tooth flank, so that in addition to the chain roller arranged between the two links, this at least one inner chain link is also supported. Although with constant tooth widths the outer link pair following the inner link pair engages the following tooth with lateral clearance, the guide segment ensures an improvement in the guiding properties on the tooth gap base adjacent to the tooth that engages with little clearance and thus engages in a guiding manner in the intermediate space between the inner link pair. With the inventive measure, the guided chain segment may also be lengthened when the gear teeth have a tooth width that remains constant in that the inner chain links are guided not only via the tooth that engages in their intermediate space, but also in the area of the tooth gap base. Thus, it is not just every second chain member that is guided via every second tooth of the guide wheel, but also areas of the chain in the area of individual segments of the guide wheel on the tooth gap base.

It should be taken into account that, depending on the chain used, the chain links have a certain radial overhang over the chain rollers. Allowances are made for this condition of a radial overhang by the chain links. For this reason, it is provided in a refinement of the invention that the at least one guide segment is offset radially inward relative to the tooth gap base. For instance, the overhang by the inner chain links relative to the chain rollers is about 0.5 mm, a slight clearance between chain pins and these surrounding chain rollers being taken into account. Consequently the at least one guide segment would be set back radially inward by the same amount, in the example by 0.5 mm, relative to the tooth gap base. In particular it may be provided in this context that the at least one guide segment is offset radially inward relative to the root circle of the gear teeth in order to take into account the radial overhang of the chain links relative to the chain rollers.

One refinement of the invention provides that the at least one guide segment extends along one tooth, at least partially. What this measure attains is that the inner chain link is also supported radially in the area of the tooth flank. What it further attains is that in addition to the inventive solution of guiding the inner chain links in the area of the tooth gap base and the tooth flank, outer chain links are also guided axially by the wider teeth. Thus, this embodiment of the invention does not proceed from teeth with a constant width, but rather provides a guide wheel with teeth having alternating tooth widths corresponding to the alternating spacing between outer and inner chain links. This further improves the guiding function, since the wider teeth only engage in the wider intermediate spaces between the outer link pairs of the chain with slight clearance, that is, in a guiding manner.

Furthermore, in this embodiment it may be provided that the at least one guide segment is set back circumferentially relative to the tooth flank. This makes it easier for the tooth to engage in the intermediate space between the outer link pair. In this embodiment, the guide segments are preferably each arranged in the area of a load flank of the guide wheel, that is, in the area of a tooth flank that during operation is loaded in a force-transmitting manner.

In accordance with the invention, the guide segment may be realized in different variants. In accordance with one embodiment of the invention, it may be provided that the at least one guide segment is formed by a ring segment projecting axially toward the rotational axis of the guide wheel or by a circumferential ring. This has the advantage that the guide wheel may be produced in a relatively simple manner, the axially projecting ring segment mechanically strengthening the guide wheel. It should be noted that the axially projecting ring segment is arranged in a radial position such that the supporting function described in the foregoing is provided for the chain link segments engaging in the area of the tooth gap base. In this regard, the invention is distinguished from those solutions in the prior art in which only one area is embodied about the central opening of the guide wheel for improving the bearing properties with greater material thickness, this reinforced area however being arranged at a distinctly radial distance from the engaging chain link segments.

Alternative to the embodiment with a guide segment in the form of a continuous ring segment, it may be inventively provided that the at least one guide segment is formed by a local projection that projects axially toward the rotational axis of the guide wheel and is in the area of the tooth gap base/and or is in the area of a tooth. Such local projections may be provided for instance only on individual teeth or individual tooth gap base segments, or may extend in an arc across a plurality of teeth or tooth gap base segments. As stated in the foregoing, it is possible to provide corresponding guide segments on every second tooth gap base segment or on every second tooth. In contrast to a continuous, uninterrupted annular guide segment, the embodiment of a plurality of individual guide segments has the advantage of a self-cleaning effect for the chain and the guide wheel during operation.

Furthermore, with respect to the embodiment of the guide segments on the guide wheel, in accordance with the invention it is possible for the at least one guide segment to be arranged on only one axial lateral surface of the guide wheel. This embodiment may be adequate because the guiding function is necessary especially when changing gears in one direction from smaller sprockets to larger sprockets. In contrast, when changing gears in a direction from a larger sprocket to a smaller sprocket, a certain axial mobility of the chain may be advantageous. Nevertheless, in one alternative embodiment of the invention at least one guide segment may also be provided on both axial lateral surfaces of the guide wheel.

One refinement of the invention provides that the guide wheel is beveled, at least in segments, in the area of tooth flanks that face one another and in the area of the tooth gap base. The beveling of tooth flanks that face one another, especially in the area of the tooth head of individual teeth or of all teeth, makes it easier for the teeth to penetrate into the intermediate spaces between the chain links. In this context, it may be provided that the guide segment is arranged outside of the beveled area. Alternatively, however, it is also possible for the at least one guide segment to extend into the beveled area. This improves the guiding properties in accordance with the present invention for supporting the chain links, despite beveling.

One refinement of the invention provides that the at least one guide segment includes a projection that is polygonal when viewed in the direction of the rotational axis, preferably a projection embodied as a parallelogram, the radially outer surface of which runs tangential to the root circle or parallel to a tangent of the root circle. As indicated in the foregoing, at least part of the guide segment may also extend along a tooth to the tooth head or to the tip of the tooth.

For cleaning and for the purposes of reducing weight it may furthermore be provided that the wheel body of the inventive guide wheel has axial cut-outs arranged at regular angular distances.

The invention furthermore relates to a rear derailleur for a bicycle derailleur gear system for guiding a chain that has at least one guide wheel of the aforesaid type.

BRIEF DESCRIPTION OF THE SEVERAL VIEWS OF THE DRAWINGS

The invention is illustrated by way of example below based on the attached figures.

DETAILED DESCRIPTION OF THE INVENTION

Figure 1:
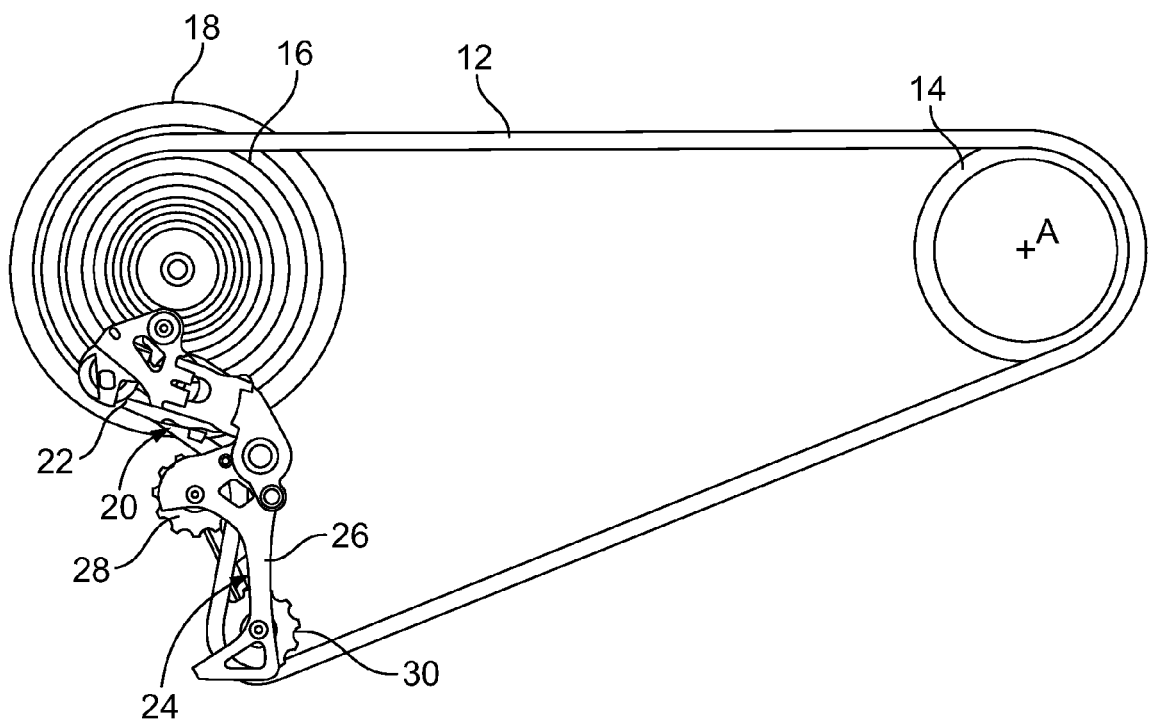
FIG. 1 is a schematic overview of a derailleur gear system.

FIG. 1 shows a schematic depiction of a drive train or gear arrangement for a bicycle, labeled 10 overall. It includes a continuous chain 12, such as a roller chain, which is guided around a schematically drawn front chain wheel 14, which can be driven about a rotational axis A, and around a sprocket 16 of a rear sprocket set 18. The rear sprocket set 18 in the example shown is embodied with a total of 11 sprockets of different sizes.

Furthermore shown in FIG. 1 is a rear derailleur 20 that may be attached to the frame of a bicycle in a standard manner (not shown). The rear derailleur 20 has a lever arrangement 22 with which the former may be adjusted via a control cable (not shown) against a spring tension. The rear derailleur 20 furthermore has a chain guide arrangement 24 with a chain guide carrier 26 on which two guide wheels 28, 30 are rotatably borne. The chain guide arrangement 24 guides the chain 12 when driven, tensions the lower, non-driven chain strand using a pre-tensioning force exerted on the chain guide arrangement 24 and during a gear changing operation on the rear derailleur 20 guides the chain 12 into a target position and holds it in this position continuously after the gear changing operation.

To these ends the chain 12 is conducted through the chain guide arrangement 24 in an S-shape so that it engages with the two guide wheels 28 and 30 and is positioned and guided by them. The guide wheels 28 and 30 shall be described in detail in the following.

Figure 2:
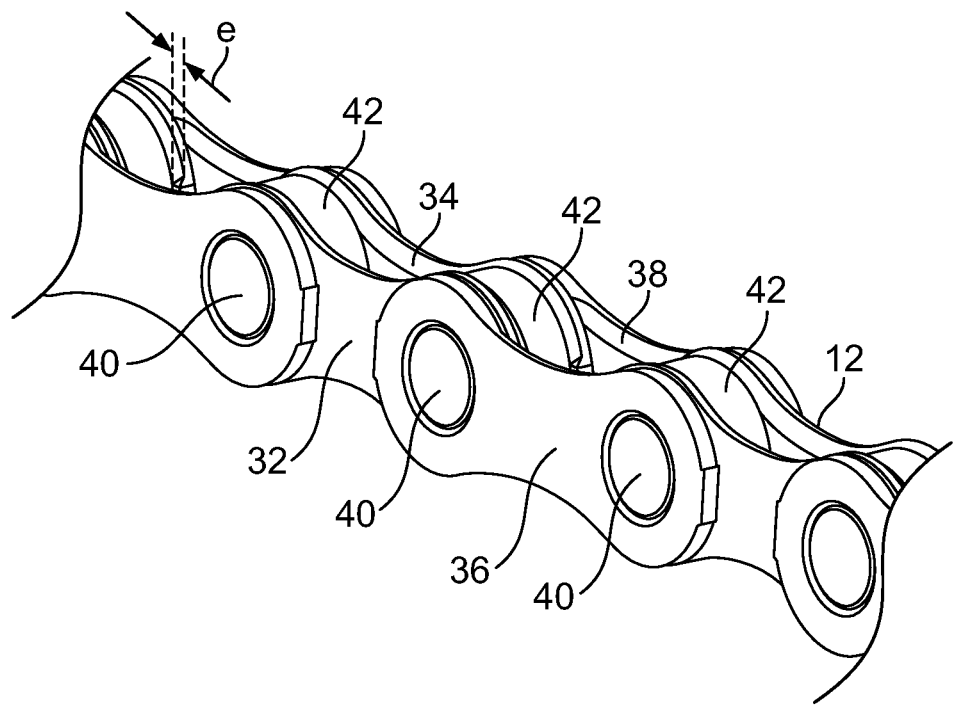
FIG. 2 is a perspective view of a segment of chain.
Figure 3:
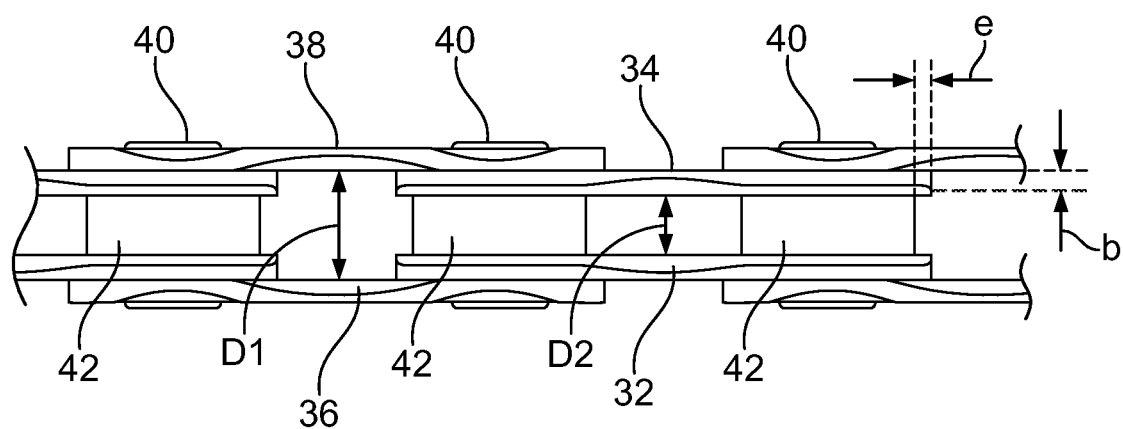
FIG. 3 is a top view of a segment of chain.

FIGS. 2 and 3 depict different views of a segment of the chain 12. It may be seen that the chain 12 has pairs of both inner chain links 32, 34 and outer chain links 36, 38. These are arranged alternating, that is, a pair of the outer chain links 36, 38 follows a pair of the inner chain links 32, 34. The individual chain links are connected to one another via chain pins 40 that extend transverse to the longitudinal direction of the chain 12. The chain pins 40 are enclosed by chain rollers 42 that are embodied as hollow cylinders and are arranged rotatable on the chain pins 40.

It may be seen that the pairs of chain links 32, 34 and 36, 38 have different spacing. The outer chain links 36, 38 are arranged at a spacing D1 that is greater than a spacing D2 between the inner chain links 32, 34. The spacing D2 is approximately equal to the width of the chain rollers 42 plus a slight clearance between the chain rollers 42 and the inner chain links 32, 34. The spacing D1 is greater than the spacing D2 by the width 2b of the two inner chain links 32, 34.

It may also be seen that each of the inner chain links 32, 34 projects beyond the outer circumference of the chain rollers 42 by an overhang "e". This overhang "e" remains essentially constantly dimensioned across about 260° around the outer circumferential surface of the chain rollers 42, as may be seen for instance in FIG. 2.

Finally, it may be seen that in the area of the intermediate spaces between the two chain links 32, 34 or 36, 38 the chain links 32, 34 and 36, 38 are each beveled in order to make it easier for a tooth to enter during operation.

The following will address a first embodiment of the invention with respect to the configuration of the guide wheels 28, 30. The guide wheel 28 shall be described as an example, but the description shall apply equally to the guide wheel 30.

Figure 6:
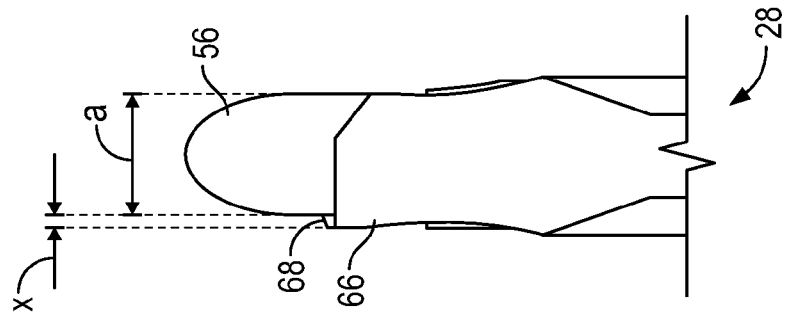
FIG. 6 is an enlargement of the detail VI from FIG. 5.
Figure 5:
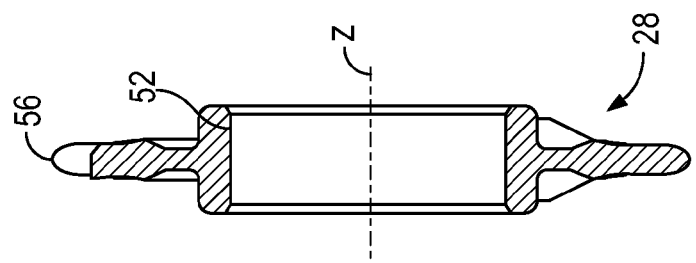
FIG. 5 is a sectional view along the line V-V of FIG. 4 of the first embodiment of the invention
Figure 4:
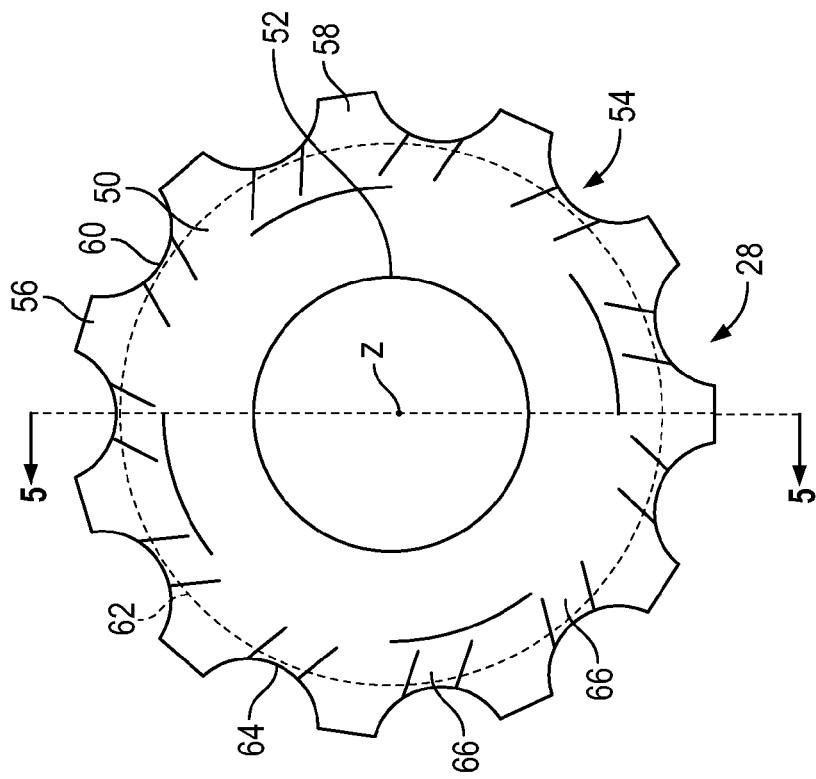
FIG. 4 is a front view of a guide wheel in accordance with a first embodiment of the invention.

The guide wheel 28 described in FIGS. 4 through 6 has an annular wheel body 50 that is provided with a central opening 52. This central opening 52 accommodates a ball bearing or the like. On its outer circumferential surface the guide wheel 28 has gear teeth 54 with a total of eleven teeth that project radially outward, a tooth gap 60 being provided between the circumferentially successive teeth 56, 58 (as an example). A root circle 62 is drawn in with a broken line in FIG. 4; it runs through the most radially inwardly disposed points on the tooth gaps 60. The area around this most radially inwardly disposed point of the tooth gaps 60 shall be referred to as the tooth gap base in the following and is labeled 64 in FIG. 4.

As may be seen in FIGS. 5 and 6, in the area in which they interact with the chain 12 and engage in the intermediate spaces between the chain links, all of the teeth 56 are embodied with a predetermined width "a" that remains essentially constant. Provided in each area near the tooth gap base 64 are additional guide segments that are configured as projections 66 that project axially and the geometry of which is essentially a parallelogram (FIG. 4). This results on each tooth gap base 64 in a lateral projection 66 having the dimension "x" with a radially outwardly directed support surface 68 that runs in the circumferential direction, as is drawn in FIG. 6. These lateral projections 66 are arranged slightly below the tooth gap base 64 and below the root circle 62, i.e., they are radially inwardly offset relative to the center axis Z of the guide wheel 28.

The support surfaces 68 of the projections 66 interact with the chain 12 and radially support the inner chain links 32, 34 in the area of the chain rollers 42 relative to the center axis Z of the guide wheel 28. The measure by which the support surface 68 of the lateral projection 66 is radially inwardly offset is approximately equal to the measure "e" of the overhang of the inner chain links 32, 34 over the chain rollers 42. This ensures that the chain 12 is guided via the engaging teeth 56, but also is radially supported in the area of the tooth gaps 60 via the overhanging inner chain links 32, 34 near the chain rollers 42 on the surfaces 68 of the projections 66.

The guiding properties of the guide wheel 28 are significantly improved by this additional support function using the projections 66. In particular with respect to the larger link spacing D1 between the outer chain links 36, 38, which, due to the clearance between these chain links 36, 38 and the engaging tooth 56, guide the chain 12 less precisely than is the case between the inner chain links 32, 34 due to the smaller link spacing D2. The projections 66 have the advantage that the chain 12 is guided not only via the teeth 56 engaging in the chain intermediate spaces, but also is additionally guided in the area of the tooth gaps 60. This can effectively counter faulty functioning, for instance vibrations with the chain on an incline, gear changing problems, chain jamming, noisiness, and/or increased wear.

It should be noted that projections 66 are only provided on one side of the guide wheel 28 in the embodiment in accordance with FIGS. 4 through 6. In a modified embodiment, these projections 66 may also be provided on both sides of the guide wheel 28. It should be further noted that the individual projections 66 depicted have a self-cleaning effect.

Figure 9:
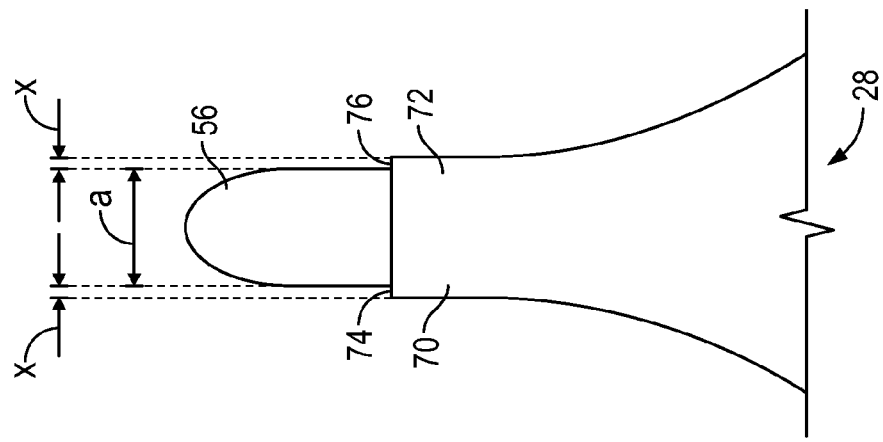
FIG. 9 is an enlargement of the detail IX from FIG. 8.
Figure 8:
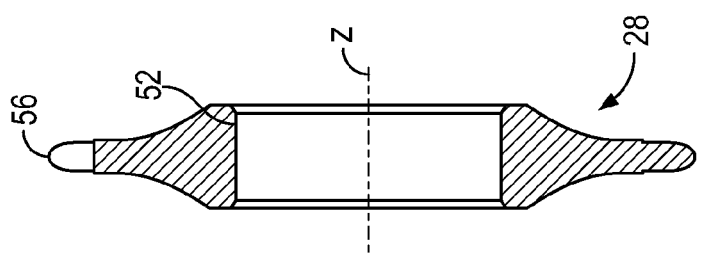
FIG. 8 is a sectional view along the line VIII-VIII from FIG. 7 of the second embodiment of the invention.
Figure 7:
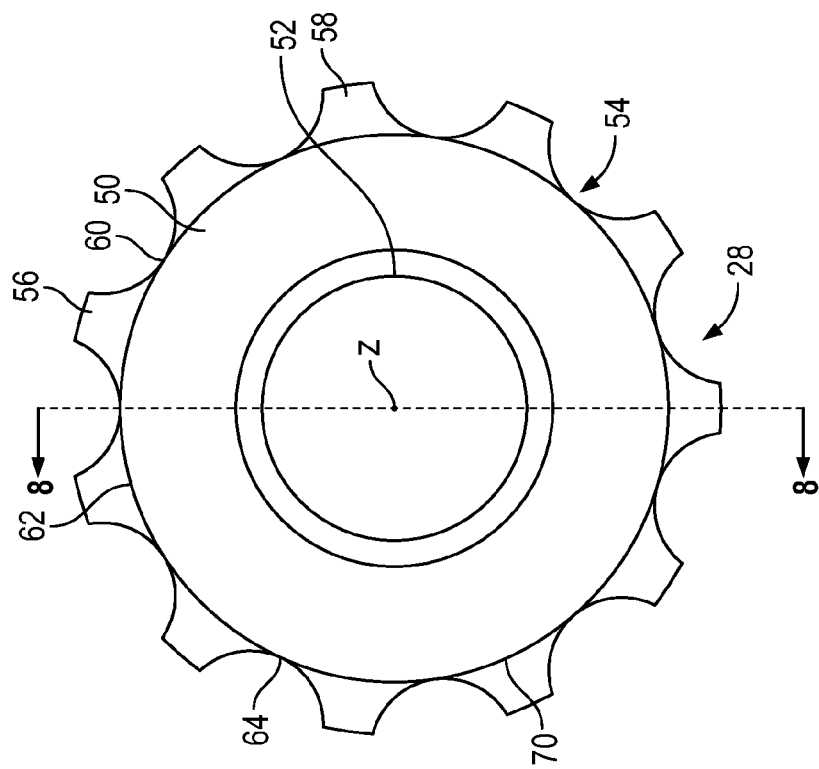
FIG. 7 is a front view of a guide wheel in accordance with a second embodiment of the invention.

FIGS. 7 through 9 depict a second embodiment of the invention. To avoid repetition and facilitate the description, only the differences from the first embodiment shall be discussed for this second embodiment. Furthermore the reference numbers used in the foregoing shall continue to be used for equivalent or similar components.

The embodiment in accordance with FIGS. 7 through 9 is distinguished from the embodiment in accordance with FIGS. 4 through 6 only in that individual projections 66 are not provided on each tooth base 64, but rather a projecting annular area 70 and 72 that is closed in the circumferential direction is provided on both sides of the guide wheel 28 in the area of the root circle 62, again offset slightly downward. The projecting annular area 70 has a support surface 74 that runs in the circumferential direction and that is oriented radially outward. The projecting annular area 72 has a support surface 76 that runs in the circumferential direction and that is oriented radially outward. The two support surfaces 74, 76 again support the inner chain links 32, 34 in the area of the chain roller 42 in accordance with the description in the foregoing.

The embodiment in accordance with FIGS. 7 through 9 is distinguished by relatively simple production.

Figure 12:
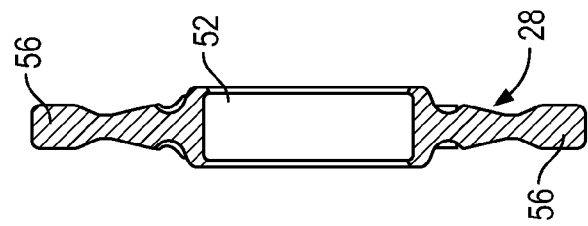
FIG. 12 is a sectional view along the line XII-XII of FIG. 10 of the third embodiment of the invention.
Figure 11:
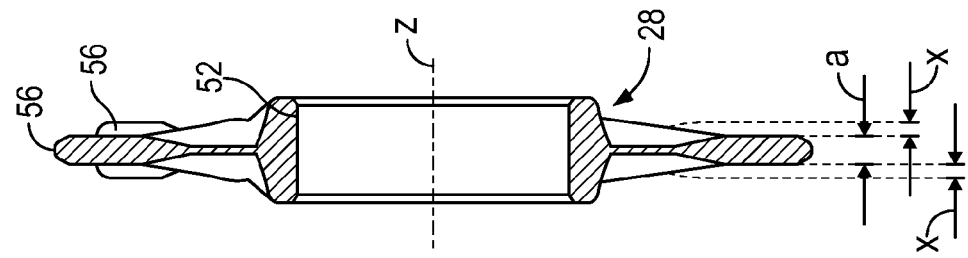
FIG. 11 is a sectional view along the line XI-XI of FIG. 10 of the third embodiment of the invention.
Figure 10:
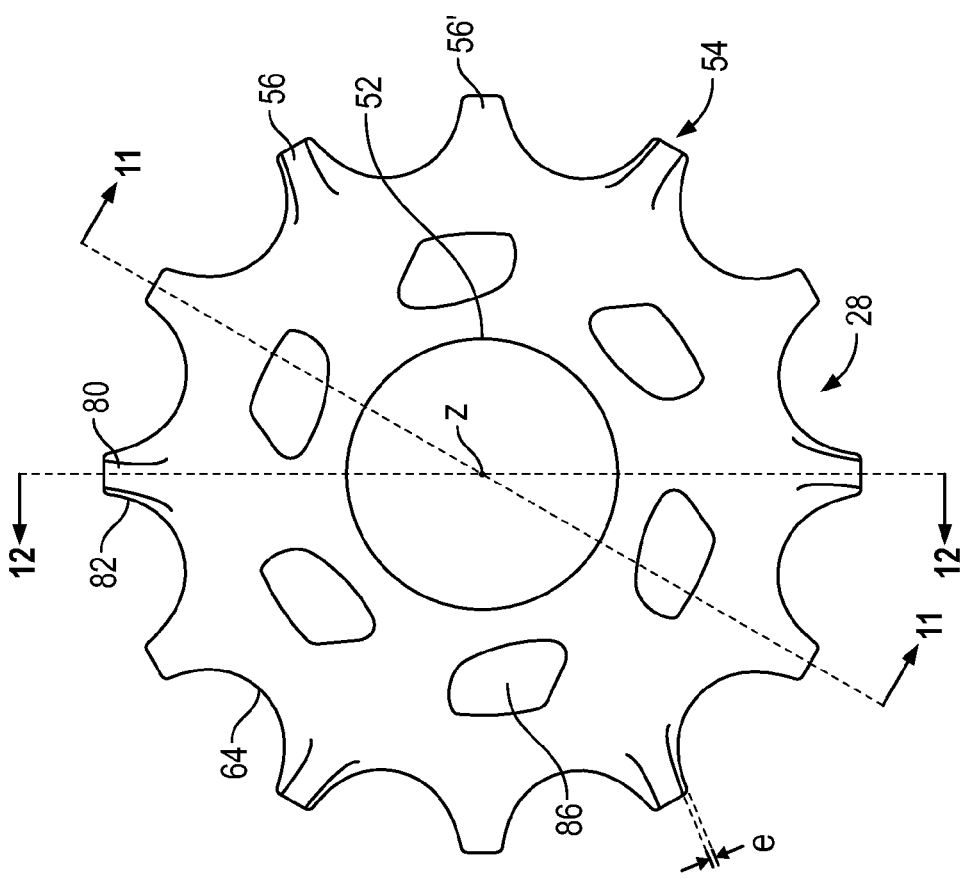
FIG. 10 is a front view of a guide wheel in accordance with a third embodiment of the invention.

FIGS. 10 through 12 depict a third embodiment of the invention. To avoid repetition and facilitate the description, only the differences from the first and second embodiments shall be discussed for this third embodiment. Furthermore the reference numbers used in the foregoing shall continue to be used for equivalent or similar components.

The embodiment in accordance with FIGS. 10 through 12 is embodied similar to the embodiment in accordance with FIGS. 4 through 6, but with an even number of a total of 12 teeth. The projections 80 are only provided on every second tooth 56. These projections 80 extend along the relevant teeth 56 so that every second tooth 56 is embodied with greater material thickness than the tooth 56' disposed therebetween that does not have projections 80. The projections 80 are arranged on both sides of the teeth 56. This ensures that the material thickness of the teeth 56, 56' is matched to the alternating receipt of the subsequent larger and smaller spacing D1 and D2 between the inner and outer chain links 32, 34 and 36, 38.

The function of the projections 80 is not limited to making every second tooth 56 thicker. As may be seen, the projections 80 extend near the tooth flank 82 of the tooth 56 that is loaded for transmitting force, but again set back by the measure "e" that equals the overhang "e" of the inner chain links 32, 34 relative to the chain rollers 42. The projections 80 furthermore extend into the area of the tooth gap base 64, the projections 80 having a slightly rounded flank 84. The inclined course of the projections 80 and this segment 84 of the projections 80 in the area of the tooth gap base 64 support the inner chain links 32, 34 radially, as described with respect to the preceding exemplary embodiments.

The embodiment in accordance with FIGS. 10 through 12 thus depicts alternating tooth thicknesses for the teeth 56 and 56', which teeth engage in the chain intermediate spaces with alternating link spacing D1 and D2. In addition, guidance is improved by the guide segments embodied in the form of the projections 80, which guide segments support the inner chain links 32, 34, especially radially, in the area of the tooth flank 82 and tooth gap base 64, as well.

The views in accordance with FIGS. 11 and 12 each depict sections through the thicker and inner teeth.

Finally, recesses 86 that are arranged at regular angular distances in the wheel body may also be seen in the embodiment in accordance with FIGS. 10 through 12. This measure contributes to reducing weight. Overall the invention has different embodiments that contribute to significantly improving the guiding properties of the guide wheel 28 for a rear derailleur in a bicycle gear system. This is especially advantageous in those cases in which, due to a plurality of sprockets, a relatively pronounced chain incline may occur during gear changing operations but also during operation between two gear changing operations. The challenge is in creating improved guiding properties for ensuring error-free operation and low wear compared to the prior art. The invention meets this challenge.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A guide wheel for a rear derailleur in a bicycle gear system for guiding a chain, comprising:
    an annular wheel body with a central opening for rotation about a rotational axis of the guide wheel;
    a plurality of radially projecting gear teeth arranged on an outer circumferential surface of the wheel body, each of the gear teeth at or near a root circle of the gear teeth having a predetermined tooth width engageably receivable by the chain;
    a tooth gap arranged between adjacent gear teeth; and
    at least one chain guide segment with a greater width than that of at least one of the adjacent gear teeth, the at least one guide segment located on one or both of i) at least some of the tooth gaps at a tooth gap base and ii) on at least some of the gear teeth.

2. A guide wheel in accordance with claim 1, wherein the at least one chain guide segment is offset radially inwardly relative to the tooth gap base.

3. A guide wheel in accordance with claim 1, wherein the at least one chain guide segment is offset radially inwardly relative to the root circle of the gear teeth.

4. A guide wheel in accordance with claim 1, wherein the at least one chain guide segment extends along at least a section of one of the gear teeth.

5. A guide wheel in accordance with claim 4, wherein the at least one chain guide segment is set back circumferentially relative to a flank of the one of the gear teeth.

6. A guide wheel in accordance with claim 1, wherein the at least one chain guide segment is formed by a ring segment projecting axially or by a circumferential ring.

7. A guide wheel in accordance with claim 1, wherein the at least one chain guide segment is formed by a local projection that projects axially and is one or both of i) at the tooth gap base and ii) at or near one of the gear teeth.

8. A guide wheel in accordance with claim 1, wherein the guide wheel includes two axial lateral surfaces and at least one chain guide segment is arranged on only one of the axial lateral surfaces.

9. A guide wheel in accordance with claim 1, wherein the guide wheel includes two axial lateral surfaces and at least one chain guide segment is provided on both of the axial lateral surfaces.

10. A guide wheel in accordance with claim 1, wherein each of the gear teeth includes tooth flanks and wherein the guide wheel is beveled, at least in segments, on or near the tooth flanks that face one another and the tooth gap base.

11. A guide wheel in accordance with claim 10, wherein the at least one chain guide segment is arranged outside of the beveled area.

12. A guide wheel in accordance with claim 10, wherein the at least one chain guide segment extends into the beveled area.

13. A guide wheel in accordance with claim 1, wherein the at least one chain guide segment includes a projection that is polygonal when viewed in the direction of the rotational axis.

14. A guide wheel in accordance with claim 13, wherein the projection is embodied as a parallelogram, a radially outer surface of which runs one of tangential to the root circle and parallel to a tangent of the root circle.

15. A guide wheel in accordance with claim 1, wherein the wheel body has axial cut-outs arranged at regular angular distances.

16. A guide wheel in accordance with claim 1, wherein the predetermined width is common to all of the gear teeth.

17. A rear derailleur for a bicycle derailleur gear system for guiding a chain that has at least one guide wheel, the guide wheel comprising:
    a derailleur cage movably attached to the derailleur;
    an annular wheel body supported by the derailleur cage, the wheel body having a central opening for rotation about a rotational axis of the guide wheel;
    a plurality of radially projecting gear teeth arranged on an outer circumferential surface of the wheel body, each of the gear teeth at or near a root circle of the gear teeth having a predetermined tooth width engageably receivable by the chain;

a tooth gap arranged between adjacent gear teeth; and at least one chain guide segment with a greater width than that of at least one of the adjacent gear teeth, the at least one chain guide segment located on one or both of i) at least some of the tooth gaps at a tooth gap base and ii) on at least some of the gear teeth.

18. A rear derailleur in accordance with claim 17, wherein the at least one chain guide segment is offset radially inwardly relative to the tooth gap base.

19. A rear derailleur in accordance with claim 17, wherein the at least one chain guide segment is offset radially inwardly relative to the root circle of the gear teeth.

20. A rear derailleur in accordance with claim 17, wherein the at least one chain guide segment extends along at least a section of one of the gear teeth.

21. A rear derailleur in accordance with claim 20, wherein the at least one chain guide segment is set back circumferentially relative to a flank of the one of the gear teeth.

22. A rear derailleur in accordance with claim 17, wherein the at least one chain guide segment is formed by a ring segment projecting axially or by a circumferential ring.

23. A rear derailleur in accordance with claim 17, wherein the at least one chain guide segment is formed by a local projection that projects axially and is one or both of i) at the tooth gap base and ii) at or near one of the gear teeth.

24. A rear derailleur in accordance with claim 17, wherein the guide wheel includes two axial lateral surfaces and the at least one chain guide segment is arranged on only one of the axial lateral surfaces.

25. A rear derailleur in accordance with claim 17, wherein the guide wheel includes two axial lateral surface and the at least one chain guide segment is provided on both axial lateral surfaces.

26. A rear derailleur in accordance with claim 17, wherein each of the gear teeth include tooth flanks and wherein the guide wheel is beveled, at least in segments, on or near the tooth flanks that face one another and the tooth gap base.

27. A rear derailleur in accordance with claim 26, wherein the at least one chain guide segment is arranged outside of the beveled area.

28. A rear derailleur in accordance with claim 26, wherein the at least one chain guide segment extends into the beveled area.

29. A rear derailleur in accordance with claim 17, wherein the at least one chain guide segment includes a projection that is polygonal when viewed in the direction of the rotational axis.

30. A rear derailleur in accordance with claim 29, wherein the projection is embodied as a parallelogram, the radially outer surface of which runs one of tangential to the root circle and parallel to a tangent of the root circle.

31. A rear derailleur in accordance with claim 17, wherein the wheel body has axial cut-outs arranged at regular angular distances.

* * * * *